United States Patent Office 2,774,764
Patented Dec. 18, 1956

2,774,764

2-(ARALKOXYALKYL) DERIVATIVES OF TETRA-HYDROISOQUINOLINE AND ISOINDOLINE

John W. Cusic, Skokie, Ill., assignor, by mesne assignments, to G. D. Searle & Co, Skokie, Ill., a corporation of Delaware No Drawing. Application October 21, 1953, Serial No. 387,505

15 Claims. (Cl. 260—289)

The present invention relates to a new group of heterocyclic compounds and, more particularly, to derivatives of 1,2,3,4-tetrahydroisoquinoline and of isoindoline, and their salts, which are substituted in the 2-position by a lower aralkoxyalkyl radical.

Of special interest are the 1,2,3,4-tetrahydroisoquinoline and 2-isoindoline derivatives which contain in the 2-position a radical of the type $$(Ar)_n\text{—A—O—B}$$

wherein A and B are lower bivalent saturated hydrocarbon radicals, $n$ is an integer smaller than three, and Ar is a lower aromatic radical.

In the foregoing structural formula A and B represent such lower bivalent hydrocarbon radicals as methylene, ethylene, propylene, butylene, amylene and hexylene as well as such polymethylene derivatives as trimethylene, tetramethylene, pentamethylene, and hexamethylene. Among the radicals which Ar can represent are such lower aromatic hydrocarbon radicals as phenyl, tolyl, xylyl, naphthyl, dimethylnaphthyl, anthracyl, phenanthryl, and fluorenyl; however, the total number of the carbon atoms in $(Ar)_n$ should be no more than 16, since derivatives with heavier substituents are usually unsuitable for the purpose of this invention. Also within the scope of my invention are the compounds wherein Ar is a corresponding halogenated or a lower alkoxylated aryl radical such as fluorophenyl, dichlorotolyl, bromoxylyl, iodonaphthyl, anisyl, veratryl, asaryl, phenetyl, and the like.

The 2-aralkyloxyalkyl side-chain can be introduced into unsubstituted isoindolines and tetrahydroisoquinolines and also into those containing as an additional nuclear substituent in the hydrogenated nucleus a lower alkyl or phenyl radical.

The compounds which constitute this invention are valuable as intermediates in chemical synthesis. They have been found to possess highly useful therapeutic properties. They have the ability of correcting certain cardiovascular dysfunctions and, particularly, cardiac arrhythmias. Further, they have a potent vasodilator action. The quaternary salts are of value because of their effect on the autonomic nervous system and other salts are valuable as active ingredients in parasiticidal compositions of matter.

One of the convenient methods for the preparation of the compounds of this invention is represented schematically as follows:

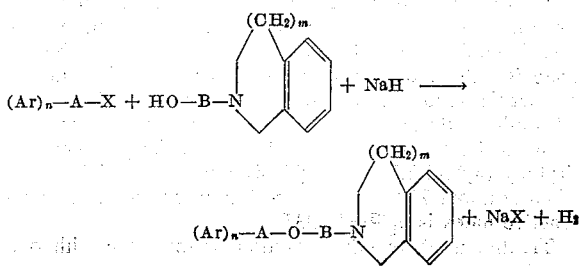

$m$ being zero or one, X being halogen and all other symbols being defined as hereinabove. Another method consists in the direct introduction of the side chain $$(Ar)_n\text{—A—O—B}$$

in the 2-position by heating the 1,2,3,4-tetrahydroisoquinoline or isoindoline with a halide of the type $$(Ar)_n\text{—A—O—B—X}$$

all symbols being defined as hereinabove.

Still another suitable method involves the treatment of a 1,2,3,4-tetrahydroisoquinoline or isoindoline containing a haloalkyl substituent in the 2-position with an arylalkanol of the structural formula $$(Ar)_n\text{—A—OH}$$

in the presence of an alkaline condensing agent.

The organic bases described herein form salts which are non-toxic in therapeutic dosage with a variety of inorganic and strong organic acids, including sulfuric, phosphoric, hydrochloric, hydrobromic, hydroiodic, sulfamic, citric, lactic, maleic, malic, succinic, tartaric, cinnamic, acetic, benzoic, gluconic, ascorbic and related acids. They also form quaternary isoquinolinium salts with a variety of organic esters of sulfuric, hydrohalic and aromatic sulfonic acids. Among such esters are methyl chloride, bromide and iodide; ethyl chloride, propyl chloride, butyl bromide, isobutyl chloride, benzyl chloride, phenethyl chloride, naphthylmethyl chloride, dimethyl sulfate, methyl benzenesulfonate, ethyl toluenesulfonate, ethylene chlorohydrin, propylene chlorohydrin, allyl chloride, methallyl bromide and crotyl bromide.

My invention is disclosed in further detail by the following examples which are set forth for the purpose of illustrating this invention, but are in no way to be construed as limiting it in spirit or in scope. It will be apparent to those skilled in the art of organic synthesis that many conventional modifications in methods, conditions and materials can be adopted without departing therefrom. In these examples, temperatures are given uncorrected in degrees centigrade (° C.), pressures in millimeters (mm.) of mercury and quantities in parts by weight.

This application is a continuation-in-part of my co-pending application, Serial No. 244,714, filed August 31, 1951 now abandoned.

EXAMPLE 1

*2-(β-benzyloxyethyl)-1,2,3,4-tetrahydroisoquinoline*

To a suspension of 72 parts of sodium hydride in 4500 parts of anhydrous toluene, 531 parts of 1,2,3,4-tetrahydroisoquinoline-2-ethanol are added fairly rapidly with stirring and heating to produce a regular evolution of hydrogen. The mixture is heated for 2 hours after which benzyl chloride is added dropwise. Heating at reflux temperature is continued for 12 hours. Then the mixture is filtered and the filtrate is extracted with dilute hydrochloric acid. The aqueous layer is separated and rendered alkaline by addition of sodium hydroxide. The base is extracted with ether and the ether extract is dried over anhydrous potassium carbonate, filtered and evaporated. The 2-(β-benzyloxyethyl)-1,2,3,4-tetrahydroisoquinoline is distilled at about 192–194° C. and 2 mm. pressure. A solution of this base in ether is treated with one equivalent of a 25% solution of hydrogen chloride in anhydrous isopropanol. The initially sticky hydrochloride solidifies within a short time. Recrystallized from butanone, it melts at about 129–130° C. The salt has the structural formula

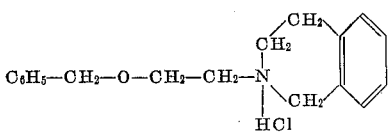

EXAMPLE 2

2-(β-benzyloxyethyl)-1,2,3,4-tetrahydroisoquinoline

A mixture of 265 parts of 1,2,3,4-tetrahydroisoquinoline and 172 parts of 1-benzyloxy-2-chloroethane is heated under reflux for 24 hours. The reaction mixture is extracted with dilute hydrochloric acid and the aqueous layer washed with ether and then rendered alkaline. The base is extracted with ether and the ether extract dried over anhydrous calcium sulfate, filtered and evaporated. The 2-(β-benzyloxyethyl)-1,2,3,4-tetrahydroisoquinoline is a clear colorless oil which is obtained upon fractionation at about 193–194° C. and 2 mm. pressure. The hydrochloride is prepared as in the preceding example. A mixed melting point test shows no depression.

EXAMPLE 3

2 - (β - benzyloxyethyl) - 2 - methyl - 1,2,3,4 - tetrahydroisoquinolinium iodide 100 parts of 2-(β-benzyloxy)-1,2,3,4-tetrahydroisoquinoline, 228 parts of methyl iodide and 4000 parts of butanone are mixed, and upon standing for a short time at 0° C., an oil separates which crystallizes upon standing at that temperature for several days. The resulting 2-(β-benzyloxyethyl)-2-methyl-1,2,3,4-tetrahydroisoquinolinium iodide melts at about 103—104° C.

EXAMPLE 4

2-(γ-benzyloxypropyl)-1,2,3,4-tetrahydroisoquinoline

A stirred mixture of 382 parts of 2-(γ-hydroxypropyl)-1,2,3,4-tetrahydroisoquinoline and 70 parts of sodium hydride in 8700 parts of anhydrous toluene is heated at reflux for 2 hours and then treated by rapid addition with 300 parts of benzyl chloride. The mixture is heated for 2 hours at reflux with stirring and then treated with 24 parts of ethanol while stirring is continued for 2 hours. The reaction mixture is then extracted with dilute hydrochloric acid and the extract is made alkaline by addition of sodium hydroxide and extracted with ether. This extract is dried over anhydrous potassium carbonate, filtered and evaporated to yield the 2-(γ-benzyloxypropyl)-1,2,3,4-tetrahydroisoquinoline which is distilled at about 185–200° C. and 2 mm. pressure. The distillate has a refractive index of $n_D^{25}=1.5700$. Treatment of an ether solution of this base with one equivalent of alcoholic hydrogen chloride yields an oily hydrochloride which, on crystallization from a mixture of butanone and ethyl acetate melts at about 134–136° C. It has the structural formula

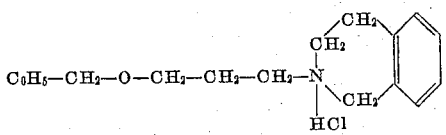

EXAMPLE 5

2-(β-benzyloxypropyl)-1,2,3,4-tetrahydroisoquinoline

A stirred mixture of 382 parts of 2-(β-hydroxypropyl)-1,2,3,4-tetrahydroisoquinoline, 60 parts of sodium hydride and 8700 parts of anhydrous toluene is refluxed for 4 hours and then treated by fairly rapid addition with 300 parts of benzyl chloride. Refluxing is continued for 2 hours after which the mixture is permitted to stand at room temperature for 10 hours and stirred with 24 parts of ethanol for 2 hours. Dilute aqueous hydrochloric acid is added and the aqueous layer is separated, rendered alkaline and extracted with ether. This extract is dried over anhydrous potassium carbonate, filtered and evaporated to yield the 2-(β-benzyloxypropyl)-1,2,3,4-tetrahydroisoquinoline as an oil which is distilled at about 183–185° C. and 2 mm. pressure. The refractive index is $n_D^{25}=1.5570$. Its hydrochloride, crystallized from a mixture of ethyl acetate, isopropanol and ether melts at about 99–101° C.

EXAMPLE 6

2-[β-(o-tolylmethoxy)ethyl]-1,2,3,4-tetrahydroisoquinoline

A mixture of 23 parts of 1,2,3,4-tetrahydroisoquinoline-2-ethanol and 5 parts of sodium hydride in 870 parts of toluene is stirred and refluxed for 3 hours and then heated with 25 parts of o-bromomethyltoluene for 12 hours at reflux temperature. The mixture is then stirred with 30 parts of ethanol and extracted with dilute hydrochloric acid. The extract is rendered alkaline and extracted with ether. This extract is dried over anhydrous potassium carbonate, filtered and evaporated to yield the 2 - [β - (o-tolylmethoxy)ethyl]-1,2,3,4-tetrahydroisoquinoline which is distilled at about 188–190° C. and 2 mm. pressure. The refractive index is $n_D^{25}=1.5670$.

Treatment of an etheric solution of this base with alcoholic hydrogen chloride yields the hydrochloride which solidifies in a few minutes. On crystallization from a mixture of butanone and isopropanol, it melts at about 148–149° C. The compound has the structural formula

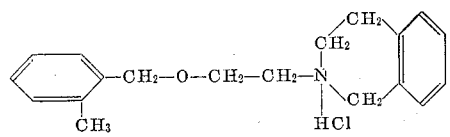

EXAMPLE 7

2-[β-(1-naphthylmethoxy)ethyl]-1,2,3,4-tetrahydroisoquinoline

A mixture of 355 parts of 1,2,3,4-tetrahydroisoquinoline-2-ethanol, 70 parts of sodium hydride and 8700 parts of toluene is stirred and refluxed for 3 hours and then treated in the course of 15 minutes with 353 parts of 1-chloromethylnaphthalene. After refluxing for 2 hours, the mixture is stirred for an hour with 300 parts of ethanol and extracted with dilute hydrochloric acid. The extract is rendered alkaline and extracted with ether. This ether extract is dried over anhydrous potassium carbonate, filtered and evaporated to yield 2-[β-(1-naphthylmethoxy)-ethyl]-1,2,3,4-tetrahydroisoquinoline which distills at about 218–222° C. and 2 mm. pressure. The refractive index is $n_D^{25}=1.6130$. The hydrochloride, crystallized from isopropanol, melts at about 140–142° C. It has the structural formula

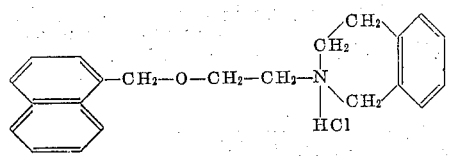

EXAMPLE 8

2-(β-benzhydryloxyethyl)-1,2,3,4-tetrahydroisoquinoline

A mixture of 246 parts of benzhydryloxyethyl chloride and 266 parts of 1,2,3,4-tetrahydroisoquinoline in 17,500 parts of anhydrous toluene is refluxed for 12 hours. A precipitate forms within a short time. The reaction mixture is cooled, treated with ether and filtered. The filtrate is extracted with dilute hydrochloric acid and the extract is rendered alkaline and extracted with ether. This ether extract is dried over anhydrous potassium carbonate, filtered and evaporated to yield the 2-(β-benzhydryloxyethyl)-1,2,3,4-tetrahydroisoquinoline which is distilled at about 229–231° C. and 2 mm. pressure. The refractive index is $n_D^{25}=1.5935$.

Treatment of an ether solution of this base with one equivalent of alcohol hydrogen chloride causes precipitation of a sticky hydrochloride which solidifies on standing at 0° C. for 2 days. Recrystallized from a mixture of isopropanol and ether, this salt melts at about 141–142° C. It has the structural formula

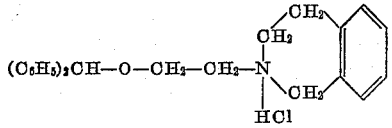

EXAMPLE 9

*2-(β-benzyloxyethyl)-3-methyl-1,2,3,4-tetrahydroisoquinoline*

A mixture of 382 parts of 3-methyl-1,2,3,4-tetrahydroisoquinoline-2-ethanol, 70 parts of sodium hydride and 8700 parts of anhydrous toluene is stirred and refluxed for 4 hours and then treated with 300 parts of benzyl chloride. Refluxing is continued for 2 hours, after which the mixture is cooled and treated with 250 parts of ethanol. The mixture is then extracted with dilute hydrochloric acid and the extract is rendered alkaline and extracted with ether. The ether solution is dried over anhydrous potassium carbonate, filtered and evaporated to yield the 2 - (β - benzyloxyethyl) - 3-methyl-1,2,3,4-tetrahydroisoquinoline which is distilled at about 195–198° C. and 2 mm. pressure. The liquid has the refractive index of $n_D^{25}=1.5610$. The hydrochloride, crystallized from butanone, melts at about 101–102° C. The compound has the structural formula

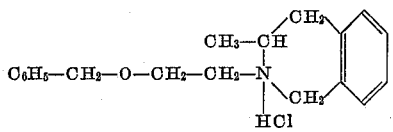

EXAMPLE 10

*2-[α,α-dimethyl-(γ-p-tolylpropoxy)methyl]-1,2,3,4-tetrahydroisoquinoline*

To a hot, stirred suspension of 24 parts of sodium hydride in 1500 parts of toluene, 192 parts of α,α-dimethyl-1,2,3,4-tetrahydro-2-isoquinolinemethanol are added fairly rapidly. After heating for 2 hours at reflux temperature, 216 parts of p-(γ-chloropropyl)toluene are dropped into this mixture and heating at reflux temperature is continued for 15 hours. The reaction mixture is filtered and the filtrate is extracted with hydrochloric acid. The acidic layer is washed with ether and rendered alkaline by the addition of ammonium hydroxide. The base is extracted with ether and the ether extract dried over anhydrous calcium sulfate, stirred with decolorizing charcoal, filtered and evaporated. Upon distillation at about 190–195° C. and 0.3 mm. pressure, the 2-[α,α-dimethyl-(γ-p-tolylpropoxy)methyl] - 1,2,3,4 - tetrahydroisoquinoline is obtained as a light amber, high-boiling oil, which has the structural formula

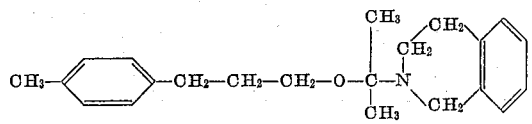

EXAMPLE 11

*2-(δ-benzyloxybutyl)-1-methyl - 1,2,3,4 - tetrahydroisoquinoline*

100 parts of 1-benzyloxy-4-chlorobutane, distilled at 12 mm. pressure and 135° C. and a solution of 145 parts of 1-methyl-1,2,3,4-tetrahydroisoquinoline in 800 parts of toluene are heated at reflux temperature for 15 hours and then extracted with hydrochloric acid. The aqueous layer is separated, rendered alkaline by addition of sodium hydroxide and extracted with ether. The ether extract is dried over anhydrous potassium carbonate, filtered and evaporated. Distillation at about 180–183° C. and 0.2 mm. pressure yields the 2-(δ-benzyloxybutyl)-1-methyl-1,2,3,4-tetrahydroisoquinoline as a clear yellowish oil which has the structural formula shown below. It is soluble in ether, chloroform, carbon tetrachloride, and the common aromatic hydrocarbon solvents.

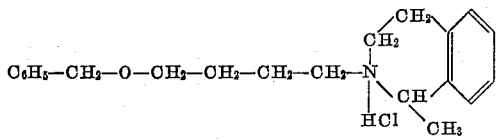

EXAMPLE 12

*2-(ω-benzyloxyhexyl)-1-phenyl - 1,2,3,4 - tetrahydroisoquinoline*

A mixture of 40 parts of 1-benzyloxy-6-chlorohexane, and 37 parts of 1-phenyl-1,2,3,4-tetrahydroisoquinoline and 8 parts of sodium hydroxide in 1500 parts of toluene is stirred and heated at reflux temperature for 15 hours and then poured on ice and hydrochloric acid. The aqueous layer is separated, washed with ether, rendered alkaline by addition of sodium hydroxide, and extracted with ether. The ether extract is dried over anhydrous potassium carbonate, stirred with charcoal, filtered and evaporated. The residue contains the 2-(ω-benzyloxyhexyl)-1-phenyl-1,2,3,4-tetrahydroisoquinoline which is an orange oil which is soluble in ether, chloroform and lower boiling aromatic hydrocarbons and has the structural formula

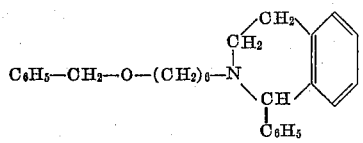

EXAMPLE 13

*2-[β-(p-chlorobenzyloxy)ethyl] - 1,2,3,4 - tetrahydroisoquinoline*

A stirred mixture of 354 parts of 1,2,3,4-tetrahydroisoquinoline-2-ethanol, 70 parts of sodium hydride and 8700 parts of anhydrous toluene is refluxed for 150 minutes and then treated with 350 parts of α,p-dichlorotoluene. Stirring and refluxing is continued for an hour, after which the reaction mixture is permitted to stand for 12 hours. It is then stirred with 240 parts of ethanol for 2 hours. The reaction mixture is diluted with water, rendered alkaline and extracted with ether. This extract is dried over anhydrous potassium carbonate, filtered and evaporated to yield the 2-[β-(p-chlorobenzyloxy)ethyl]-1,2,3,4-tetrahydroisoquinoline which is distilled at about 183–185° C. at 2 mm. pressure. It has a refractive index $n_D^{25}=1.5730$. Treatment of an ether solution of this base with alcoholic hydrogen chloride yields a crystalline hydrochloride which, crystallized from a mixture of butanone and isopropanol, melts at about 148–149° C. This salt has the structural formula

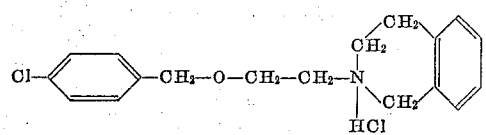

EXAMPLE 14

*2-[β-(m,p-dichlorobenzyloxy)ethyl]-1,2,3,4-tetrahydroisoquinoline*

A stirred mixture of 354 parts of 1,2,3,4-tetrahydroisoquinoline-2-ethanol, 70 parts of sodium hydride and 8700 parts of anhydrous toluene is refluxed for 3 hours and then treated in the course of 15 to 20 minutes with 398 parts of α,m,p-trichlorotoluene, stirred and heated at reflux for 2 hours. After standing at room temperature for several hours, the mixture is stirred for an hour with 240 parts of ethanol and then treated with dilute hydrochloric acid. The acidic layer is separated, rendered alkaline and extracted with ether. This extract is dried over anhydrous potassium carbonate, filtered and evaporated under vacuum to yield the 2-[β-(m,p-dichlorobenzyloxy)ethyl]-1,2,3,4-tetrahydroisoquinoline which is distilled at about 225–230° C. and 2 mm. pressure. The oil has a refractive index $n_D^{25}=1.5815$. Its hydrochloride, crystallized from isopropanol, melts at about 156–157° C. This salt has the structural formula

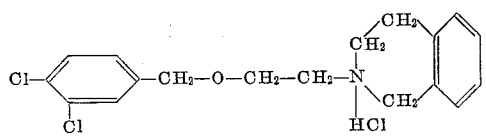

EXAMPLE 15

*2-(o-iodobenzyloxymethyl) - 3 - methyl - 1,2,3,4 - tetrahydroisoquinoline*

A stirred suspension of 35 parts of sodium hydride in 5000 parts of toluene is treated with 177 parts of 3-methyl-1,2,3,4-tetrahydro-2-isoquinolinemethanol and, after refluxing for 2 hours, with 260 parts of o-iodobenzyl chloride by dropwise addition. Refluxing is continued for 3 hours after which the reaction mixture is permitted to stand at room temperature for 10 hours. Then it is stirred with 150 parts of ethanol for an hour and extracted with dilute hydrochloric acid. The extract is washed with ether, rendered alkaline by addition of ammonium hydroxide and extracted with ether. This ether extract is washed with water, dried over anhydrous potassium carbonate, stirred with charcoal, filtered and evaporated leaving the 2-(o-iodobenzyloxymethyl)-3-methyl-1,2,3,4-tetrahydroisoquinoline as a yellowish, high-boiling oil which has the structural formula

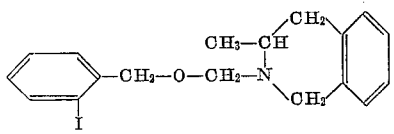

EXAMPLE 16

*2-[β-(p-methoxybenzyloxy)ethyl]-1,2,3,4-tetrahydroisoquinoline*

A stirred mixture of 49 parts of 1,2,3,4-tetrahydroisoquinoline-2-ethanol, 10 parts of sodium hydride and 866 parts of anhydrous toluene is refluxed for 2 hours and treated with 45 parts of p-methoxybenzyl chloride. Refluxing is continued for 2 hours, after which the reaction mixture is permitted to stand at room temperature for 10 hours. Then it is stirred for an hour with 24 parts of ethanol and extracted with dilute hydrochloric acid. The extract is rendered alkaline and extracted with ether. This ether solution is dried over anhydrous potassium carbonate, filtered and evaporated to yield the 2-[β-(p-methoxybenzyloxy)ethyl]-1,2,3,4-tetrahydroisoquinoline which is distilled at about 200–205° C. and 2 mm. pressure. The liquid has a refractive index of $n_D^{25}=1.5678$. The treatment of an ether solution of this base with one equivalent of hydrogen chloride in anhydrous isopropanol yields an oily hydrochloride, which solidifies on standing for a short time. On crystallization from a mixture of butanone and isopropanol, this hydrochloride melts at about 121–122° C. The salt has the structural formula

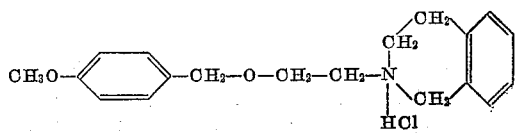

EXAMPLE 17

*2-(β-benzyloxyethyl)isoindoline*

A mixture of 60 parts of sodium hydride and 350 parts of 2-isoindolineethanol in 4500 parts of toluene is stirred and refluxed for 4 hours. Then 300 parts of benzyl chloride are added portion-wise and refluxing is continued for 4 hours. The reaction mixture is then treated with ice and dilute hydrochloric acid. The acidic layer is separated and extracted with ether. This extract is dried over anhydrous potassium carbonate, filtered and evaporated to yield 2-(β-benzyloxyethyl)isoindoline which is distilled at about 170–172° C. and 2 mm. pressure. An ether solution of this base is treated with one equivalent of a 25% solution of hydrogen chloride in anhydrous isopropanol. The resulting precipitate is dissolved in hot isopropanol. On addition of ethyl acetate and cooling, the crystalline hydrochloride is obtained which melts at about 125–126° C. It has the structural formula

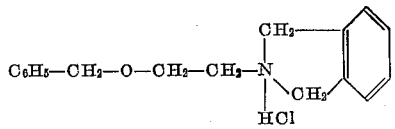

EXAMPLE 18

*2-[γ-(o-chlorobenzyloxy)propyl]isoindoline*

A stirred mixture of 71 parts of 2-isoindolinepropanol, 14 parts of sodium hydride and 175 parts of anhydrous toluene is refluxed for 3 hours and then treated with 70 parts of α,o-dichlorotoluene. Stirring and refluxing are continued for 2 hours. Then 50 parts of ethanol are added and, after 30 minutes of stirring, the reaction mixture is diluted with water, rendered alkaline and extracted with ether. This ether extract is dried over anhydrous potassium carbonate, filtered and evaporated to yield 2-[γ-(o-chlorobenzyloxy)propyl]isoindoline which is distilled at about 180–190° C. and 2 mm. pressure. It has the structural formula

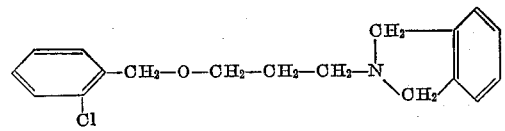

I claim:
1. A compound of the structural formula

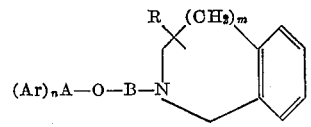

wherein A and B are lower alkylene radicals, $m$ is an integer selected from the group consisting of zero and one, $n$ is a positive integer less than three, R is a member of the class consisting of hydrogen, lower alkyl and phenyl radicals and Ar is a member of the class consisting of methoxyphenyl, aryl hydrocarbon, and haloaryl radicals, the total number of carbon atoms in $(Ar)_n$ being between 6 and 16 carbon atoms, inclusive.

2. A compound of the structural formula

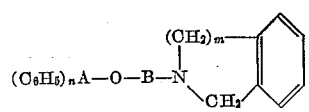

wherein A and B are lower alkylene radicals, and $m$ and $n$ are positive integers less than three.

3. A compound of the structural formula

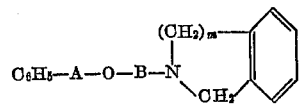

wherein A and B are lower alkylene radicals and *m* is a positive integer less than three.

4. A compound of the structural formula

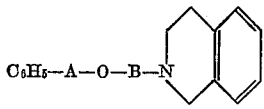

wherein A and B are lower alkylene radicals.

5. A compound of the structural formula

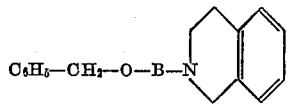

wherein B is a lower alkylene radical.

6. A compound of the structural formula

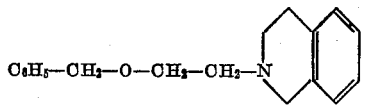

7. A compound of the structural formula

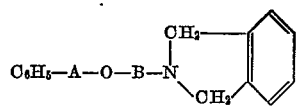

wherein A and B are lower alkylene radicals.

8. A compound of the structural formula

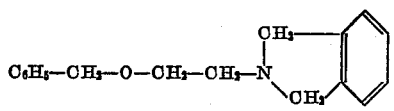

9. A compound of the structural formula

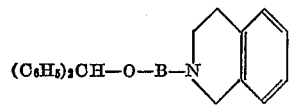

wherein B is a lower alkylene radical.

10. A 1,2,3,4-tetrahydroisoquinoline derivative of the structural formula

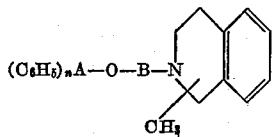

wherein A and B are lower alkylene radicals and *n* is a positive integer less than three.

11. A 1,2,3,4-tetrahydroisoquinoline derivative of the structural formula

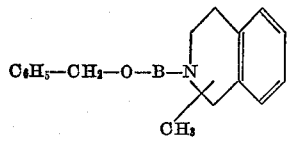

wherein B is a lower alkylene radical.

12. A 1,2,3,4-tetrahydroisoquinoline derivative of the structural formula

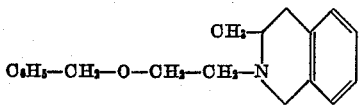

13. A compound of the structural formula

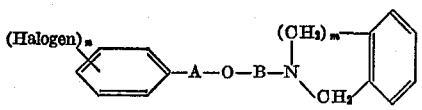

wherein A and B are lower alkylene radicals and *m* and *n* are positive integers less than three.

14. A compound of the structural formula

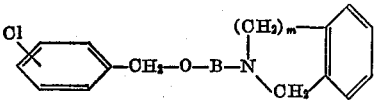

wherein B is a lower alkylene radical and *m* is a positive integer less than three.

15. A compound of the structural formula

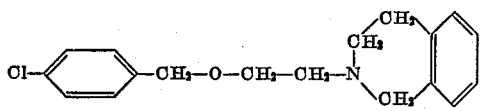

References Cited in the file of this patent

UNITED STATES PATENTS 2,567,351    Rieveschl _____ Sept. 11, 1951